Sept. 27, 1955        J. H. LEMONS        2,719,217

HEADLIGHT ADJUSTMENT DEVICE

Filed Jan. 11, 1952        2 Sheets-Sheet 1

INVENTOR
JOHN H. LEMONS

BY
McMorrow, Berman & Davidson
ATTORNEYS

Sept. 27, 1955 J. H. LEMONS 2,719,217
HEADLIGHT ADJUSTMENT DEVICE
Filed Jan. 11, 1952 2 Sheets-Sheet 2

INVENTOR
JOHN H. LEMONS

BY
McMorrow, Berman & Davidson
ATTORNEYS

United States Patent Office 2,719,217
Patented Sept. 27, 1955

2,719,217

HEADLIGHT ADJUSTMENT DEVICE

John H. Lemons, Houston, Tex.

Application January 11, 1952, Serial No. 266,060

2 Claims. (Cl. 240—61.8)

This invention relates to automobile headlights, and more particularly to a means for adjusting the angle of the headlights of an automobile vehicle.

A main object of the invention is to provide a novel and improved headlight adjusting means for use in a motor vehicle, such as a motor truck or passenger car, the adjusting means enabling the operator of the vehicle to change the angle of inclination of the headlights thereof in accordance with different loading conditions of the vehicle so that the headlight beams will efficiently illuminate the roadway in front of the vehicle, the improved adjusting means being simple in construction, being easy to install and being easy to operate.

A further object of the invention is to provide an improved headlight adjusting mechanism for a motor vehicle such as a motor truck or passenger car, the mechanism involving inexpensive components, being rugged in construction, and being easy to maintain in operating condition.

Further objects and advantages of the invention will become apparent from the following description and claims, and from the accompanying drawings, wherein:

Figure 1:
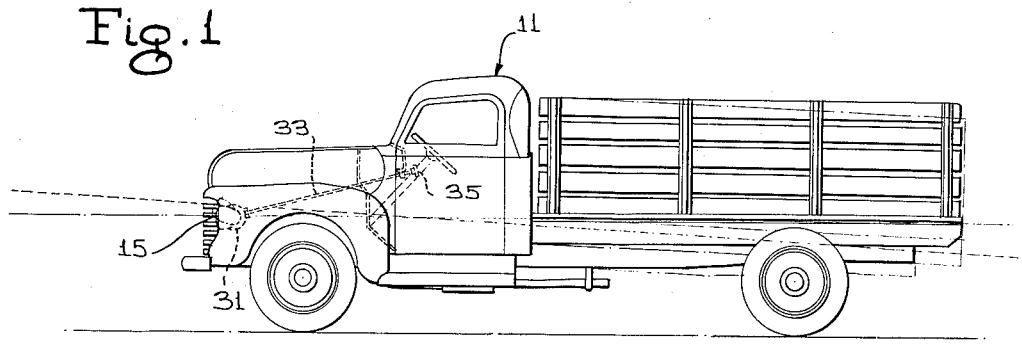
Figure 1 is a side elevational view of a motor truck equipped with an improved headlight adjusting mechanism in accordance with the present invention.
Figure 2:
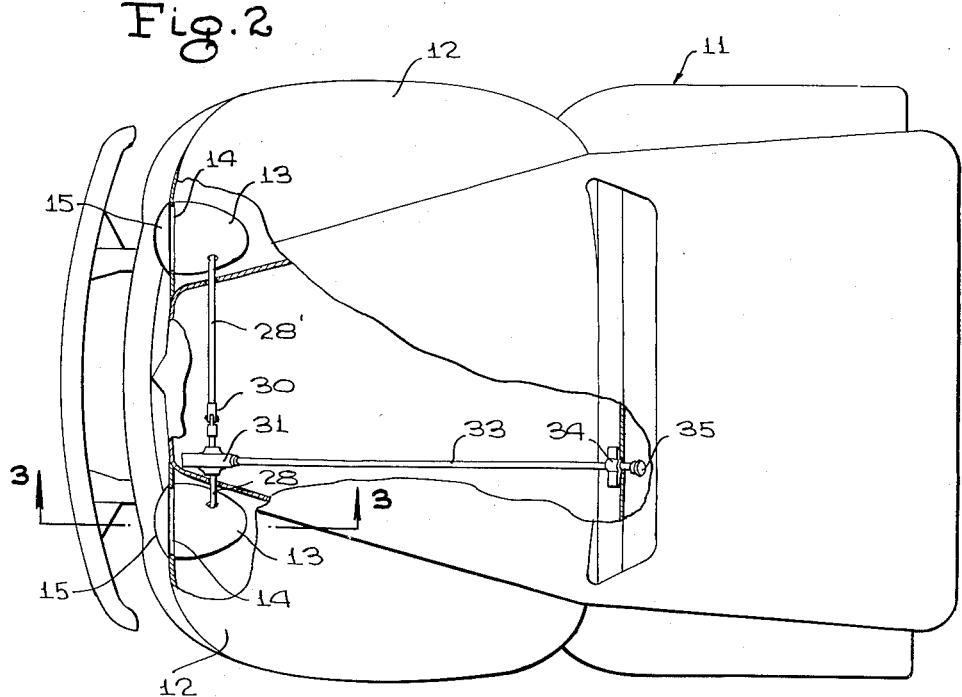
Figure 2 is a top view of the cab and forward portion of the truck of Figure 1, with parts broken away, and illustrating the arrangement of the headlight adjusting mechanism of the present invention.

Referring to the drawings, 11 designates a motor truck having the respective front fenders 12, 12 formed with the forwardly facing headlight housings 13, 13. The forwardly facing open ends of the housings 13, 13 are formed with the respective marginal rims 14, 14.

Each headlight housing 13 contains a sealed beam headlight unit 15 which is secured between the mating semi-circular strap members 16, 16, which form a mounting ring, each headlight unit 15 being formed with a peripheral flange 17 and the flange 17 being secured on opposite sides thereof to respective diametrically opposed lugs 18, 18 on the strap members 16, 16 by means of bolts 19, 19. The lower ends of the strap members 16, 16 are formed with downturned lug elements 20, 20 which are pivotally connected to an upstanding lug 21 in the bottom of the housing 13 by a transversely extending rivet 22. The top ends of the strap members 16, 16 are formed with the upstanding lugs 23, 23 between which extends the end of a link bar 24, the lugs 23, 23 being pivotally connected to the link bar 24 by a bolt member 25. Designated at 26 and 27 are respective coiled springs which connect one of the lugs 23 respectively to the forward portion of the top wall of housing 13 and to a rearwardly located portion of the top wall of said housing, thereby biasing the sealed beam headlight unit 15 to a normal position, for example to a position wherein the axis of the sealed beam unit 15 is substantially horizontal, or to a position wherein said axis is inclined downwardly by a small angle.

Designated respectively at 28 and 28' are the horizontally extending shaft segments having rigidly secured to their ends respective crank bars 29 which are pivotally connected to the ends of the respective link bars 24. The shaft segments 28 and 28' are connected together by a universal coupling 30 so that said shaft segments 28 and 28' rotate simultaneously. Designated at 31 is a gear housing which is rotatably mounted on the shaft section 28 and which contains a worm sector 32 secured on the shaft 28 and thus journaled in the housing 31. Designated at 33 is a control shaft which extends rearwardly and upwardly in a vertical longitudinal plane substantially at right angles to shaft section sections 28 and 28', the control shaft 33 being rotatably mounted at its rear end in a bearing bracket 34 secured to the instrument panel of the motor vehicle, said control shaft 33 being provided at its end with a knob 35 for manually rotating the shaft, the forward portion of shaft 33 being journaled at 37 in a bearing seat 38 formed in the lower portion of gear housing 31. Between bearing 38 and bushing 36 the shaft 33 has secured thereon a worm 39 which meshes with the worm sector 32, as shown in Figure 5.

Figure 5:
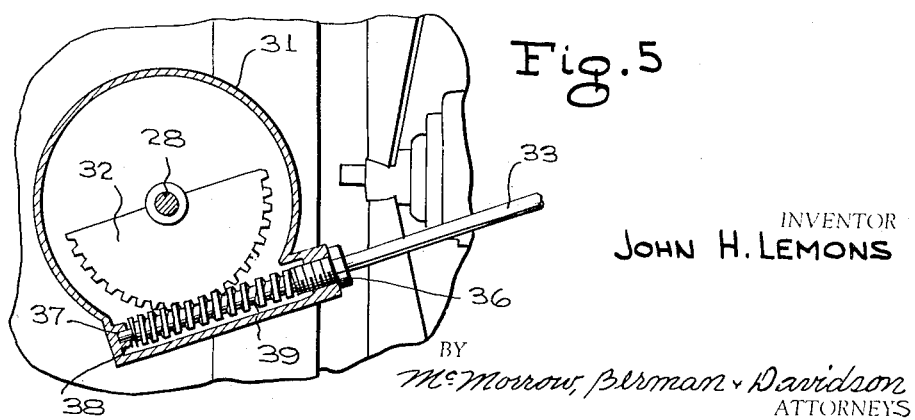
Figure 5 is a cross sectional detail view taken on the line 5—5 of Figure 4.
Figure 3:
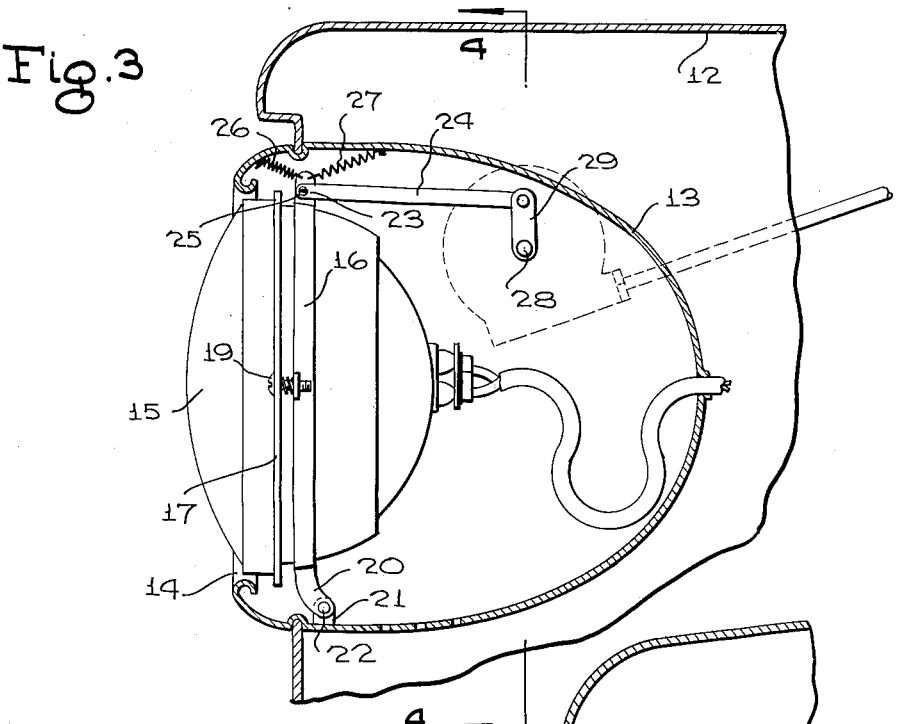
Figure 3 is an enlarged cross sectional detail view taken on the line 3—3 of Figure 2.
Figure 4:
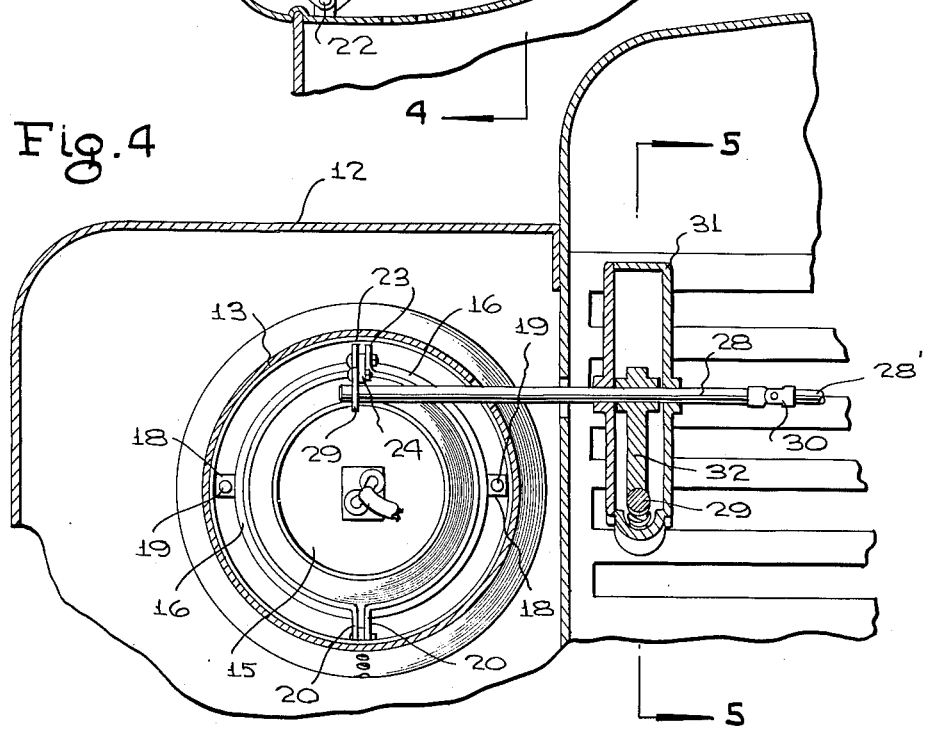
Figure 4 is a cross sectional view taken on the line 4—4 of Figure 3.

From Figure 5 it will be readily apparent that rotation of the shaft 33 is transmitted through the worm 39 and worm sector 32 to the respective coupled shafts 28 and 28' and their cranks 29 and link bar 24 to the respective pivotally mounted sealed beam headlight units, whereby the headlight units may be tilted to desired angles of inclination by merely rotating the knob 35. Such an adjustment of the headlight units may be required, for example, when the vehicle is loaded, causing the rear portion of the vehicle to be depressed and elevating the forward portion of said vehicle, as shown for example in dotted view in Figure 1. The elevation of the forward portion of the vehicle causes the axes of the headlight units to be elevated, whereby the headlight beams would extend forwardly above and away from the roadway surface instead of downwardly onto the roadway surface. To correct this condition, the operator of the vehicle merely rotates the headlight adjusting knob 35, whereby the headlight units may be titled to provide the desired illumination of the roadway in front of the vehicle.

While a specific embodiment of an improved motor vehicle headlight adjusting means has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In combination, a headlight enclosure having a bottom wall, a vertical mounting ring within said enclosure, a headlight unit secured in said mounting ring, said mounting ring having a lower portion, pivotal mounting means associated with the lower portion of the mounting ring and the bottom wall of the enclosure supporting the mounting ring for tilting on a horizontal axis, and operating means connected with said mounting ring at a point spaced above the lower portion thereof, for tilting the mounting ring.

2. In combination, a headlight enclosure having a bottom wall, a vertical mounting ring within said enclosure, a headlight unit secured in said mounting ring, said mounting ring having a lower portion, pivotal mounting means associated with the lower portion of the mounting ring and the bottom wall of the enclosure supporting the mounting ring for tilting on a horizontal axis, and operating means connected with said mounting ring at a point spaced above the lower portion thereof, for tilting the mounting ring, said mounting ring having an upper portion, and spring balancing means connected between said upper portion and said enclosure.

References Cited in the file of this patent

UNITED STATES PATENTS

| | | |
|---|---|---|
| 1,339,352 | Kennard | May 4, 1920 |
| 1,433,802 | Cotterman | Oct. 31, 1922 |
| 2,105,866 | Sheaffer | Jan. 18, 1938 |
| 2,119,892 | Snow | June 7, 1938 |
| 2,246,808 | McKechnie | June 24, 1941 |

FOREIGN PATENTS

| | | |
|---|---|---|
| 496,876 | Great Britain | Dec. 7, 1938 |